United States Patent [19]
Coffey et al.

[11] Patent Number: 5,386,968
[45] Date of Patent: Feb. 7, 1995

[54] AIRCRAFT WING DE-ICERS WITH IMPROVED HOLDOVER TIMES

[75] Inventors: David A. Coffey; Samir S. Ashrawi; Edward C. Nieh, all of Austin, Tex.

[73] Assignee: Texaco Chemical Inc., White Plains, N.Y.

[21] Appl. No.: 139,138

[22] Filed: Oct. 21, 1993

[51] Int. Cl.$^6$ .................................................. C09K 3/18
[52] U.S. Cl. ............................................ 252/70; 106/13
[58] Field of Search ........................ 106/13; 252/70, 71

[56] References Cited

U.S. PATENT DOCUMENTS

| | | | |
|---|---|---|---|
| 3,412,030 | 11/1968 | Wahlberg | 252/70 |
| 4,358,389 | 11/1982 | König-Lumer et al. | 106/13 |
| 4,585,571 | 4/1986 | Bloom | 106/13 |
| 4,698,172 | 10/1987 | Tye et al. | 106/13 |
| 4,744,913 | 5/1988 | Salvadore et al. | 106/13 |
| 4,954,279 | 9/1990 | Ma et al. | 252/70 |
| 5,118,434 | 6/1992 | Meyer et al. | 252/70 |
| 5,118,435 | 6/1992 | Nieh | 252/70 |
| 5,273,673 | 12/1993 | Ashrawi et al. | 106/13 |

FOREIGN PATENT DOCUMENTS

| | | | |
|---|---|---|---|
| 487190 | 5/1992 | European Pat. Off. | 252/70 |
| 1272464 | 4/1972 | United Kingdom | 252/70 |

*Primary Examiner*—Anthony Green
*Attorney, Agent, or Firm*—James L. Bailey; Kenneth R. Priem; David L. Mossman

[57] ABSTRACT

De-icing compositions, such as used on aircraft wing surfaces, are found to not need thickeners to obtain acceptable holdover times. The compositions are based on an alkylene glycol component (such as propylene glycol, diethylene glycol and mixtures thereof), and obtain particular advantage when a nonionic alkylphenol ethoxylate surfactant is used in conjunction with an alkylaryl sulfonate hydrotrope, as additives. This latter combination of additives gives de-icing compositions with increased holdover times with no degradation of other properties. These compositions exhibit a Newtonian rheology as required for de-icing compositions.

15 Claims, No Drawings

AIRCRAFT WING DE-ICERS WITH IMPROVED HOLDOVER TIMES

FIELD OF THE INVENTION

The invention relates to de-icing compositions, and, in one aspect, more particularly relates to de-icing compositions containing a combination of a surfactant and a hydrotrope, which compositions are thereby especially suitable for use as aircraft wing de-icers due to increased hold-over times.

BACKGROUND OF THE INVENTION

Liquid substances applied to the airfoil surfaces of aircraft to remove ice in inclement weather are well-known and are important to ensure safe and proper take off of aircraft in winter. It is also well-known that aircraft departures are often delayed under such conditions and the de-icing formulations must often be reapplied if the plane must wait an extended period and the ice reforms. These liquids must also be stable not only through temperature extremes, but also during pumping and spraying (application to the wings) and the taxiing phases of the take off procedure and also must adhere to the wing surfaces during taxiing and ground winds. The fluids may also be diluted somewhat through intentional dilution with water, such as during particularly cold conditions below the expected operating temperatures of the fluids to enable their application, or incidentally as through freezing rain conditions. In addition to these demands, the de-icing materials must also exhibit Newtonian rheology, that is, a viscosity that is shear-independent and time-independent. They simply flow off the wing surfaces after deicing. Such compositions are also useful in the de-icing of other surfaces besides air foils, for example, run-way and vehicle roadway surfaces.

De-icing/anti-icing can be performed in one or two steps. One-step de-icing/anti-icing is carried out with a de-icing fluid or an appropriately diluted or heated anti-icing fluid. The fluid is used to de-ice the aircraft remains on aircraft surfaces to provide limited anti-ice capability. Two-step de-icing/anti-icing consists of two distinct steps. The first step (de-icing) is followed by the second step (anti-icing) as a separate fluid application. Anti-icing fluid is applied to protect the relevant surfaces thus providing maximum possible anti-ice capability. However, usually two different trucks and attendant systems are used to apply the de-icing fluid and then the anti-icing fluid. It takes a few minutes to move the first, de-icing truck away and the second, anti-icing truck into position. Holdover times are thus important for de-icing fluids because the de-icing fluid should remain on the wing to protect it until the anti-icing fluid is applied. If the de-icing fluid does not protect the surface during this period, under some weather conditions clear ice can form in the interim which is quite undesirable. For more information, see SAE Aerospace Recommended Practice: Issued Proposed Draft (SAE ARP4737).

It is important to keep in mind the difference between aircraft de-icing, which is the procedure by which frost, ice, or snow is removed from the aircraft in order to provide clean surfaces, and aircraft anti-icing, which is the procedure which provides protection against the formation of frost or ice and accumulation of snow or slush on clean surfaces of the aircraft for a limited period of time. While there are similarities between de-icing compositions and anti-icing compositions, there are some important differences, too. For example, de-icing compositions have Newtonian rheology. The shear rate of a Newtonian fluid is directly proportional to the shear stress. The fluid will begin to move immediately upon application of a stress; it has no yield stress which must be accomplished before flow begins. One publication describing the important differences between de-icing compositions and anti-icing compositions (including those mentioned above) is M. S. Jarrell, "SAE Type I Aircraft Deicing/Anti-icing Fluids," FAA International Conference on Airplane Ground De-icing, May 28–29, 1992, Reston, VA.

Various anti-icing and de-icing compositions are known. For example, U.S. Pat. No. 4,585,571 mentions de-icing compositions for use on airplanes, runways, streets and the like, which have (a) an alkylene polyol, (b) an anionic surfactant capable of forming a hydrophobic monolayer on the metal surfaces of the aircraft, (c) a hydrophilic wetting agent which is capable of associating with the hydrophobic monolayer, and (d) a coupling agent, which facilitates the association between the wetting agent and the monolayer.

The precipitation of salts from glycol-based fluids when mixed with water is prevented by the addition of copolymers or terpolymers of acrylic acid or alkali metal salt thereof and one or more of the monomers selected from the group consisting of 2-acrylamido-2-methylpropyl sulfonic acid or metal salt thereof, 4-styrenesulfonic acid or metal salt thereof, a lower alkyl hydroxy acrylate, and mixtures thereof, according to U.S. Pat. No. 5,118,434. The glycol-based fluids are mentioned as de-icing fluids.

Chemical Abstract 108:223486p (1988) of Romanian patent document RO 92,551 briefly sets out sprayable de-icing compositions that form films with high shear resistance on aircraft which contain 250–500 parts propylene glycol, 5–15 parts polyacrylamide, 0.5–1 part $Na_2HPO_4$ or borax, 0.5–1 part ethoxylated nonylphenol or oleyl alcohol with a degree of ethoxylation of 17, and 250–500 parts water.

U.S. Pat. No. 4,744,913 describes an anti-icing and de-icing agent, based on glycols and water and having crosslinked acrylic polymers useful as a thickener, and also containing customary corrosion inhibitors, surfactants belonging to the group of alkali metal alkylarylsulfonates and a neutralizing agent to adjust the pH to a basic value. The agent contains, as the thickener, two selected crosslinked acrylic polymers in a specific ratio by weight to one another, namely a selected crosslinked acrylic acid or alkali metal acrylate homopolymer and a selected crosslinked acrylic acid/acrylamide or alkali metal acrylate/acrylamide copolymer in a ratio by weight of 2:1 to 10:1. The neutralizing agent may be three compounds, each in a selected amount, namely ammonia, monoethanolamine, diethanolamine and/or triethanolamine as the first alkaline compound, potassium hydroxide as the second alkaline compound and a further alkali metal hydroxide as the third alkaline compound. The new agent was found to exhibit the particular advantage that it has a relatively low viscosity even at arctic temperatures and low shear rates, which ensures rapid and complete runoff of the agent at the take-off of the aircraft even under extreme conditions.

Another liquid agent for anti-icing and protecting against icing-up is described in U.S. Pat. No. 4,358,389, by means of which it is possible, in particular, to free the metal surface of aircraft rapidly and completely from ice, hoar-frost, snow and the like, and to protect the surface against further build-up for a relatively long period. The agent is essentially composed of several components, namely of (a) glycols, (b) water, (c) thickeners, (d) substances insoluble in water, (e) surface-active agents, (f) corrosion inhibitors and (g) alkaline compounds. The quantities are very specific in each case, the quantity of the components (a) and (b) being at least 94%, relative to the total weight of the agent. Its pH value is 7.5 to 10. The component (c) thickeners are crosslinked polyacrylates described in the patent in further detail and also in U.S. Pat. No. 2,923,692.

U.S. Pat. No. 4,954,279 describes a composition consisting of a micro-emulsion of oil in a water/glycol solution containing certain thickening agents (e.g. natural and artificial gums, cellulose ethers, carboxymethylcellulose and hydroxyethylcellulose), emulsifiers, substantially water-insoluble, partially polar oils, and alkanolamines to provide the desirable viscosity and shear stability needed to give a composition having effective de-icer and anti-icing properties. The emulsifier may be anionic surfactants, nonionic surfactants and mixtures thereof, such as organo-phosphates, phosphonates, sulfates, sulfonates, fatty acid salts, alcohols, phenols, amines, fatty acids and their alkoxylated derivatives.

A composition for accelerating the melting of layers of snow or ice using anionic, nonionic and cationic wetting agents in the absence of other melt-accelerating agents is described in U.S. Pat. No. 3,412,030. The anionic wetting agent may be an alkyl aryl sulfonate, having at least one alkyl group having 12 to 15 carbon atoms. The nonionic wetting agent is selected from the group consisting of alkyl oxyethers and esters and thioethers and esters having the formula:

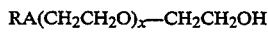

$RA(CH_2CH_2O)_x-CH_2CH_2OH$ where A is selected from the group consisting of ethereal oxygen and sulfur, amine, carboxylic ester and thiocarboxylic ester groups, R is a saturated or unsaturated hydrocarbon group of 8 to 18 carbon atoms or an aralkyl group of 8 to 18 carbon atoms, and x is from 1-20 or an alkyl.

British Patent Specification 1,272,464 discusses a de-icing fluid having an aqueous solution of an alcohol component which comprises one or more of ethylene glycol, propylene glycol and glycerol; a polyethylene glycol ether of a diisoalkylphenol; and a thickening agent which is a copolymer of acrylic acid or methacrylic acid.

There remains a need for aircraft de-icing compositions that exhibit Newtonian rheological properties and that retain their properties as the composition is diluted with water. The de-icing fluids should also remain stable during pumping and/or spraying, and should be physically stable on a surface such as an airfoil for relatively long periods of time to delay or avoid re-application of the compositions during departure holdovers, particularly during freezing rain, or generally humid and cold conditions, for example.

SUMMARY OF THE INVENTION

Accordingly, it is an object of the present invention to provide a de-icing composition that can retain its properties as the composition is diluted with water and which avoids the use of a thickener. Since no thickener is needed, the complexity and cost of the composition may be reduced.

It is another object of the present invention to provide a de-icing composition which exhibits Newtonian rheology and which has good holdover time.

Another object of the invention is to provide a de-icing composition which is stable during storage, pumping and/or spraying operations.

In carrying out these and other objects of the invention, there is provided, in one form, a de-icing composition having at least 45 wt. % of an alkylene glycol component, a nonionic alkylphenol ethoxylate surfactant, about 0.001 to about 0.01 meq/g of an alkylaryl sulfonate hydrotrope, where the alkyl group has six carbons or less; where the de-icing composition exhibits Newtonian rheology. A thickener is explicitly absent from the composition.

DETAILED DESCRIPTION OF THE INVENTION

It has been discovered that an alkylene glycol-based aircraft wing de-icing formulation which includes a nonionic alkylphenol ethoxylate surfactant in combination with an alkylaryl sulfonate hydrotrope is particularly advantageous. When both of the latter compounds are used in the inventive formulation, a de-icing agent with Newtonian rheological properties and improved holdover time is obtained. These properties allow this formulation to meet the requirements for an aircraft wing de-icer such as: (1) remaining on the wing for prolonged periods of time during freezing rain and high humidity; and (2) being stable during storage, pumping and/or spraying. It will be appreciated that the de-icing compositions of this invention have applications other than on airfoils; for example, they may be used on airport runways or vehicle roadways or the like.

The de-icing compositions of the present invention have unexpected improvement in their ice prevention capability while retaining favorable Newtonian rheology. Improved holdover times were obtained with the inclusion of small amounts of alkylaryl sulfonates which were found to function as hydrotropes. Hydrotropes are organic compounds that increase the solubility in water of other organic materials. They are not surfactants. Hydrotropes, however, increase the solubility of sparingly soluble materials in the aqueous phase by preventing the formation of liquid crystals. Surfactants, having long alkyl chains, tend to form liquid crystals. Hydrotropes, having shorter alkyl chains, disrupt these crystals and improve solubility.

Inclusion of a single nonionic alkylphenol ethoxylate surfactant was discovered to improve performance better than mixtures of more than one. Low molecular weight ethoxylates (e.g. containing about 4.0 moles of ethylene oxide) performed significantly better than higher molecular weight ethoxylates (9.5 moles ethylene oxide) at identical concentrations in the de-icer compositions. A 6.0 molar ethoxylate material by itself was found to perform better than a mixture of the 6.0 mole ethoxylate and the 9.5 mole ethoxylate.

Alkylene Glycols

The largest single component of the de-icing compositions of this invention is the alkylene glycol component, which may be made up of one or more different alkylene glycols. For example, the alkylene glycol may be selected from ethylene glycol, propylene glycol, diethylene glycol, dipropylene glycol, and mixtures thereof, as examples only. Other alkylene glycols not specifically mentioned may also be useful. In some embodiments, the alkylene glycol component is at least 45% of the composition, and in some cases at least 45%, but not more than about 95% by weight of the total de-icing composition, and in others between 45–90%. In a preferred embodiment, the alkylene glycol component ranges from about 50 to about 90 wt. %, based on the total composition.

In one embodiment of this invention, the formulation is based on propylene glycol as the anti-freeze component. However, the formulation could also include ethylene glycol, diethylene glycol or dipropylene glycol without adversely affecting the desirable properties of the fluid of this invention.

Nonionic Alkylphenol Ethoxylate Surfactants

A nonionic alkylphenol ethoxylate surfactant is a required component of the de-icing compositions of this invention. These surfactants have the formula:

$$R^1R^2C_6H_3-O-(CH_2CH_2O)_x-H$$

where $R^1$ is $C_nH_{(2n+1)}$ where n has an average value that ranges from about 8 to about 14; where $R^2$ is H or $C_nH_{(2n+1)}$ where n has an average value that ranges from about 8 to about 14; where $C_6H_3$ is a substituted benzene ring and x has an average value that ranges from about 1 to about 10, preferably x ranges from about 1 to about 8, and most preferably from about 5 to about 8. Here, x denotes the average number of moles of ethylene oxide (EO) added to the alkylphenol adduct. The distribution of the ethylene oxide addition may be broad, as in common alkylphenol ethoxylates, or narrow as in some "peaked" ethoxylates. The surfactants described by this group range from being insoluble in water to being dispersable or just soluble in water.

The amount of nonionic alkylphenol ethoxylate surfactant in the de-icing composition should range between about 0.1 and about 1.0% by weight, preferably between about 0.4 to about 0.7%. Suitable nonionic surfactants include, but are not limited to, SURFONIC® N-40 surfactant, a 4.0 EO adduct of nonylphenol; SURFONIC® N-60 surfactant, a 6.0 EO adduct of nonylphenol; SURFONIC® N-85 surfactant, a 8.5 EO adduct of nonylphenol and SURFONIC® N-95 surfactant, a 9.5 EO adduct of nonylphenol; all made by Texaco Chemical Company. It is expected that in some situations it will be desirable to use more than one surfactant. Indeed, mixtures of N-60 and N-40 are shown to be usable in this invention. And mixtures of N-60 and N-95 surfactant are usable as well. However, in a preferred embodiment, only one nonionic alkylphenol ethoxylate surfactant is employed in the composition. This may be understood to be one "peaked" ethoxylate of relatively narrow EO distribution.

Alkylaryl Sulfonate Hydrotropes

A hydrotrope is understood to be a chemical which has the property of increasing the aqueous solubility of slightly soluble organic chemicals. A hydrotrope's ratio of charge to hydrophobic bulk is high. Suitable hydrotropes for this invention are alkylaryl sulfonates which serve as hydrotropes for the sparingly soluble low molecular weight nonionic alkylphenol ethoxylate surfactants, discussed above. Alkyl groups on the hydrotrope should be relatively short, of six carbon atoms or less. Acceptable alkylaryl sulfonate hydrotropes include, but are not necessarily limited to, sodium, potassium and ammonium salts of the group of toluene sulfonate; xylene sulfonate; cumene sulfonate; naphthalene sulfonate and benzene sulfonates or any of the benzene or naphthalene sulfonates which have been mono- or disubstituted with hydrocarbon chains having six or less carbon atoms. Other hydrotropes which will make the nonionic surfactants of this invention compatible with the alkylene glycol formulation of this invention should be understood to be within the scope of this invention. These include, but are not limited to, dicarboxylic acids having short alkyl chains of six or less carbon atoms; alkylated and dialkylated diphenyloxide disulfonates having short alkyl chains of six or less carbon atoms; phosphate esters with short hydrocarbon chains ($\leq 8$ carbons), such as aliphatic alcohol or alkylphenol, e.g., and mixtures thereof.

The alkylaryl sulfonate hydrotrope is present in an amount between about 0.001 meq to about 0.01 meq per gram of the total formulation. Preferably, the alkylaryl sulfonate hydrotrope is present in a proportion of from about 0.002 meq/g to about 0.006 meq/g. It is anticipated that in some formulations it will be desirable to use more than one hydrotrope.

Optional Alcohol Ethoxylate Nonionic Surfactants

It is anticipated that an optional ingredient of the inventive de-icing compositions will be a nonionic alcohol surfactant that can improve wetting of the aircraft surface. These materials are structurally different from the nonionic alkylphenol ethoxylate surfactants discussed previously. The alcohol ethoxylate surfactant should not contribute to excessive foaming of the composition. In one embodiment, the surfactant is employed at a level of between about 0.1 to about 0.5% by weight, based on the total composition. Suitable surfactants include, but are not necessarily limited to, ethoxylates of long chain aliphatic alcohols, block copolymers of ethylene oxide and propylene oxide and related nonionic surfactants, and mixtures thereof. In one embodiment, such optional alcohol ethoxylate nonionic surfactants have the formula:

$$R-O-(CH_2CH_2O)_x-H$$

where R is $C_nH_{(2n+1)}$ where n has an average value that ranges from about 8 to about 18; and where x has an average value that ranges from about 1 to about 10. Here, x denotes the average number of moles of ethylene oxide added to the alkylphenol adduct. The distribution of the ethylene oxide addition may be broad, as in common alkylphenol ethoxylates, or narrow as in some "peaked" ethoxylates.

Corrosion Inhibitors

A corrosion inhibitor is also preferred, but optional, as part of the de-icing composition. The corrosion inhibitor may be any of those conventionally used in the art of aircraft de-icing compositions, and in one embodiment is preferred to be an alkaline metal salt of tolyltriazole or an alkaline metal salt of benzotriazole or mixtures thereof, to list only a few non-limiting examples. The corrosion inhibitor also helps prevent the glycols from possible combustion under the influence of an open electrical charge. In another embodiment of the invention, the corrosion inhibitor is present from about 0.2 to about 0.5% by weight of the composition.

Water

As is conventional, de-ionized water provides the balance of these de-icing compositions. Deionized water may be used to dilute the composition, if necessary for de-icing purposes. Often, de-icing compositions are sold and used in concentrated (undiluted) form. In one embodiment of the invention, the composition of this invention is diluted with deionized water in a 1:1 ratio. Other ratios will be found to be suitable by those of ordinary skill in the art.

The compositions of this invention have been found to retain their important properties as they are diluted with water. Additionally, the compositions have exhibited a Newtonian rheology, that is, their viscosity is independent of the rate of shear. These compositions are useful in clearing existing ice on wings and preventing further ice formation for longer than the three-minute standard set forth in Aerospace Material Specification (AMS) 1424 (issued Jan. 1, 1993), incorporated by reference herein, which standard is not currently achieved by ethylene glycol-based SAE Type I (de-icer) compositions. The composition of this invention can also be used to extend ethylene glycol-based Type I holdover times by several minutes. Recall that good holdover times are necessary for de-icing fluids, particularly in the two-step application process where a few minutes are necessary for the changeover to the application of anti-icing fluid.

Indeed, it is surprising that inclusion of the nonionic surfactant with a low ethoxylate content (six or less moles of ethylene oxide in one embodiment) along with small amounts of an alkylaryl sulfonate in an ethylene glycol-based de-icing fluid formulation gave an average holdover time of over 5 minutes for the fluid diluted 1:1 with deionized water under freezing rain conditions (Example 1). The unmodified Type I de-icer, under the same conditions, gave highly variable results, but the average holdover time of the blend did not exceed 3 minutes (Example 3). Inclusion of the same nonionic surfactant, the hydrotrope and a nonionic surfactant of slightly higher ethoxylate content (6 or more moles of EO) and an alkylaryl sulfonate hydrotrope gave a much clearer 1:1 dilution and retained a holdover time of greater than 5 minutes under the same conditions (Example 2). A blend made without the hydrotrope had slightly less holdover time and was not as uniform on the plates tested (Example 4).

The invention will be further illustrated by the following nonlimiting Examples.

EXAMPLE 1

The following components were mixed for 30 minutes to give a homogeneous, orange-red mixture:

| Component | Amount (g) |
|---|---|
| Ethylene glycol | 934.7 |
| De-ionized Water | 36.8 |
| Potassium Hydroxide (45.7 wt. %) | 7.1 |
| Phosphoric Acid (75%) | 3.8 |
| SURFONIC ® N-60 | 5.0 |
| 93% Sodium Xylene Sulfonate | 1.0 |
| TT-50S (Sodium Tolyltriazole, 50%) | 11.6 |
| Eocine Orange | 0.02 |

This solution was diluted 1:1 with deionized water, giving a slightly cloudy orange solution. The fluid was submitted for the freezing rain holdover time test and had an average holdover time of 5.29 minutes. Although the fluid had acceptable holdover time, the fluid tested tended to separate over a period of days.

EXAMPLE 2

The following components were mixed for 30 minutes to give a homogeneous orange-red solution.

| Component | Amount (wt. %) |
|---|---|
| Ethylene glycol | 93.17 |
| De-ionized Water | 3.32 |
| Potassium Hydroxide (45.7 wt. %) | 0.713 |
| Phosphoric Acid (75%) | 0.375 |
| SURFONIC ® N-60 | 0.4 |
| SURFONIC ® N-95 | 0.4 |
| Sodium Xylene Sulfonate (40% soln.) | 0.46 |
| Sodium Tolyltriazole (50%) | 1.16 |
| Eocine Orange | 0.002 |

This solution was diluted 1:1 with de-ionized water which gave a clear solution. Notice that compared to the material of Example 1, this fluid is superior because of the homogeneous 1:1 dilution. The diluted fluid was tested in the freezing rain endurance test and the high humidity endurance test, both at 0° C., and in the aerodynamic test at −26° C. The fluid had 5.17 minutes holdover time in the freezing rain endurance test, 28 minutes in the high humidity endurance test, and a boundary layer displacement thickness of 3.64 mm in the aerodynamics acceptance test.

COMPARATIVE EXAMPLE 3

A commercial, ethylene glycol-based de-icer (Texaco WD-30 de-icer) was diluted 1:1 with de-ionized water and tested in the freezing rain endurance and high humidity endurance tests in the same manner as above. The fluid had an average holdover time of only 2.5 minutes in the freezing rain test and 14:40 min. in the high humidity test. These two results are unacceptable under the new standards.

COMPARATIVE EXAMPLE 4

A de-icer was prepared in the same manner as in Example 2, except that de-ionized water was substituted for the NaXS (sodium xylene sulfonate) in the formulation. The fluid was diluted and tested as above and gave an average holdover time of 4.38 minutes in the freezing rain test. It should be noted that this is slightly less than that obtained under the same conditions in Example 2.

Tables I and II give a summary of the fluids which were formulated to achieve a holdover time goal of three minutes or greater. Table I deals specifically with the ethylene glycol-based formulations, whereas Table II deals with strictly propylene glycol-based fluids. The Tables include some of the Examples mentioned above.

TABLE I

| ↓ Component (wt. %)/Example→ | Ethylene Glycol-Based Wing De-icer | | | | | | | | |
|---|---|---|---|---|---|---|---|---|---|
| | 1 | 5 | 6 | 7 | 8 | 2 | 9 | 10 | 4 |
| Ethylene Glycol | 93.47 | 93.47 | 93.47 | 93.47 | 93.27 | 93.17 | 93.07 | 93.27 | 93.17 |
| De-ionized Water | 3.55 | 3.32 | 3.09 | 3.55 | 3.32 | 3.32 | 3.32 | 3.32 | 3.78 |
| KOH (45.7%) | 0.713 | 0.713 | 0.713 | 0.713 | 0.713 | 0.713 | 0.713 | 0.713 | 0.713 |
| Phosphoric Acid (75%) | 0.375 | 0.375 | 0.375 | 0.375 | 0.375 | 0.375 | 0.375 | 0.375 | 0.375 |
| Surfonic N-60 | 0.5 | 0.5 | 0.5 | — | 0.5 | 0.4 | 0.5 | 0.4 | 0.4 |
| Surfonic N-85 | — | — | — | 0.5 | — | — | — | — | — |

TABLE I-continued

| Component (wt. %)/Example→ | Ethylene Glycol-Based Wing De-icer | | | | | | | | |
|---|---|---|---|---|---|---|---|---|---|
| | 1 | 5 | 6 | 7 | 8 | 2 | 9 | 10 | 4 |
| Surfonic N-95 | — | — | — | — | 0.2 | 0.4 | 0.4 | 0.3 | 0.4 |
| NaXS(40%) | 0.23 | 0.46 | 0.69 | 0.23 | 0.46 | 0.46 | 0.46 | 0.46 | — |
| Na Tolyltriazole (50%) | 1.16 | 1.16 | 1.16 | 1.16 | 1.16 | 1.16 | 1.16 | 1.16 | 1.16 |
| Eocine Orange | 0.002 | 0.002 | 0.002 | 0.002 | 0.002 | 0.002 | 0.002 | 0.002 | 0.002 |
| Appearance | | | | | | | | | |
| Neat | Clear | Clear | Clear | Clear | Clear | Clear | Clear | Clear | Clear |
| 1:1 w/ Deionized Water | Cloudy | Cloudy | Cloudy | Clear | Cloudy | Clear | Cloudy | Cloudy | Clear |
| Holdover Time (min.) | 5.29 | * | * | — | * | 5.17 | * | * | 4.38 |

*These fluids were not tested because of phase separation. Phase separation is undesirable because the solution becomes inhomogeneous.

TABLE III

| Component (wt. %)/Example→ | Propylene Glycol-Based Wing De-icer | | | |
|---|---|---|---|---|
| | 11 | 12 | 13 | 14 |
| Propylene Glycol | 89.55 | 89.55 | 89.15 | 89.15 |
| Deionized Water | 7.43 | 7.43 | 7.43 | 7.43 |
| Potassium Phosphate (50%) | 1 | 1 | 1 | 1 |
| Surfonic N-40 | — | 0.4 | 0.4 | 0.2 |
| Surfonic N-60 | 0.4 | — | 0.4 | 0.6 |
| Sodium Xylene Sulfonate (40%) | 0.46 | 0.46 | 0.46 | 0.46 |
| Sodium Tolyltriazole (50%) | 1.16 | 1.16 | 1.16 | 1.16 |
| Eocine Orange | 0.002 | 0.002 | 0.002 | 0.002 |
| Appearance | | | | |
| Neat | Clear | Clear | Clear | Clear |
| 1:1 with Deionized Water | Clear | Cloudy | Cloudy | Cloudy |
| Holdover Time (min.) | 5.17 | * | * | * |

*These fluids were not tested because of phase separation. Phase separation is undesirable because the solution becomes inhomogeneous.

These fluids were not tested because of phase separation. Phase separation is undesirable because the solution becomes inhomogeneous.

Many modifications may be made in the process of this invention without departing from the spirit and scope thereof which are defined only in the appended claims. For example, one skilled in the art may discover that particular compounds or proportions thereof, which may not be explicitly recited herein, but which are nevertheless anticipated, would give desirable results. A certain combination of low molecular weight nonionic alkylphenol ethoxylate surfactants and/or a combination of alkylaryl sulfonate hydrotropes may be found to have particular advantages. Also, blends of various compositions within the scope of this invention may have de-icing applications. It will also be appreciated that the de-icing compositions may also find uses in modified form as anti-icers, and that surfaces other than airfoils could also be treated with these materials, such as vehicle windshields and exposed stationary surfaces that need to be free from ice.

We claim:

1. A de-icing composition comprising:
   at least 45 wt. % of an alkylene glycol component;
   a nonionic alkylphenol ethoxylate surfactant; and
   about 0.001 to about 0.01 meq/g of an alkylaryl sulfonate hydrotrope, where the alkyl group has six carbons or less;
   where said deicing composition excludes a thickener;
   where the de-icing composition exhibits Newtonian rheology.

2. The de-icing composition of claim 1 where the alkylene glycol component is selected from the group consisting of ethylene glycol, propylene glycol, diethylene glycol, dipropylene glycol and mixtures thereof.

3. The de-icing composition of claim 1 where the alkylene glycol component is propylene glycol and is present in an amount between about 45 and about 90% by weight of the de-icing composition.

4. The de-icing composition of claim 1 additionally comprising an alcohol ethoxylate nonionic surfactant.

5. The de-icing composition of claim 4 where the alcohol ethoxylate nonionic surfactant has the formula:

$$R-O-(CH_2CH_2O)_x-H$$

where R is $C_nH_{(2n+1)}$ where n has an average value that ranges from about 8 to about 18, and where x has an average value that ranges from about 1 to about 10.

6. The de-icing composition of claim 4 where the alcohol ethoxylate nonionic surfactant is present in an amount between about 0.1 and about 0.5% by weight of the de-icing composition.

7. The de-icing composition of claim 1 where the nonionic alkylphenol ethoxylate surfactant is present in an amount between about 0.1 and about 1.0% by weight of the de-icing composition.

8. The de-icing composition of claim 1 where the nonionic alkylphenol ethoxylate surfactant has the formula:

$$R^1R^2C_6H_3-O-(CH_2CH_2O)_x-H$$

where $R^1$ is $C_nH_{(2n+1)}$ where n has an average value that ranges from about 8 to about 14; where $R^1$ is H or $C_nH_{(2n+1)}$ where n has an average value that ranges from about 8 to about 14; where $C_6H_3$ is a substituted benzene ring and x has an average value that ranges from about 1 to about 10.

9. The de-icing composition of claim 1 where the alkylaryl sulfonate hydrotrope is selected from the group consisting of sodium, potassium and ammonium salts of the group of toluene sulfonate; xylene sulfonate; cumene sulfonate; naphthalene sulfonate; and benzene sulfonates and naphthalene sulfonates mono- or disubstituted with hydrocarbon chains having six or less carbon atoms; alkylated and dialkylated diphenyloxide disulfonates having short alkyl chains of six or less carbon atoms; and mixtures thereof.

10. A de-icing composition comprising:
    at least 45 wt. % of an alkylene glycol component;
    between about 0.1 and about 1.0% by weight of at least one nonionic alkylphenol ethoxylate surfactant having the formula:

$$R^1R^2C_6H_3-O-(CH_2CH_2O)_x-H$$

where $R^1$ is $C_nH_{(2n+1)}$ where n has an average value that ranges from about 8 to about 14; where $R^1$ is H or $C_nH_{(2n+1)}$ where n has an average value that ranges from about 8 to about 14; where $C_6H_3$ is a substituted benzene ring and x has an average value that ranges from about 1 to about 10; and between about 0.001 meq/g composition to about 0.01 meq/g composition of an alkylaryl sulfonate hydrotrope selected from the group consisting of sodium, potassium and ammonium salts of the group of toluene sulfonate; xylene sulfonate; cumene sulfonate; naphthalene sulfonate; and benzene sulfonates and naphthalene sulfonates mono- or disubstituted with hydrocarbon chains having six or less carbon atoms; alkylated and dialkylated diphenyloxide disulfonates having short alkyl chains of six or less carbon atoms; and mixtures thereof;

where said deicing composition excludes a thickener;

where the de-icing composition exhibits Newtonian rheology.

11. The de-icing composition of claim 10 where the alkylene glycol component is present in an amount between about 45 and about 90% by weight of the de-icing composition, and is selected from the group consisting of ethylene glycol, propylene glycol, diethylene glycol, dipropylene glycol and mixtures thereof.

12. The de-icing composition of claim 10 where the composition additionally comprises other components selected from the group consisting of a corrosion inhibitor, an alcohol ethoxylate nonionic surfactant, de-ionized water and mixtures thereof.

13. The de-icing composition of claim 10 comprising only one nonionic alkylphenol ethoxylate surfactant.

14. A de-icing composition comprising:
between about 45 and about 90% by weight of an alkylene glycol component selected from the group consisting of ethylene glycol, propylene glycol, diethylene glycol, dipropylene glycol and mixtures thereof;

between about 0.1 and about 1.0% by weight of at least two different nonionic alkylphenol ethoxylate surfactants, each having the formula:

$$R^1R^2C_6H_3\text{—}O\text{—}(CH_2CH_2O)_x\text{—}H$$

where $R^1$ is $C_nH_{(2n+1)}$ where n has an average value that ranges from about 8 to about 14; where $R^1$ is H or $C_nH_{(2n+1)}$ where n has an average value that ranges from about 8 to about 14; where $C_6H_3$ is a substituted benzene ring and x has an average value that ranges from about 1 to about 10;

between about 0.001 meg/g composition to about 0.01 meg/g composition of an alkylaryl sulfonate hydrotrope selected from the group consisting of sodium, potassium and ammonium salts of the group of toluene sulfonate; xylene sulfonate; cumene sulfonate; naphthalene sulfonate; and benzene sulfonates and naphthalene sulfonates mono- or disubstituted with hydrocarbon chains having six or less carbon atoms; alkylated and dialkylated diphenyloxide disulfonates having short alkyl chains of six or less carbon atoms; and mixtures thereof;

where said deicing composition excludes a thickener;

where the de-icing composition exhibits Newtonjan rheology.

15. The de-icing composition of claim 14 further comprising between about 0.1 and about 0.5 wt. % of an alcohol ethoxylate nonionic surfactant having the formula:

$$R\text{—}O\text{—}(CH_2CH_2O)_x\text{—}H$$

where R is $C_nH_{(2n+1)}$ where n has an average value that ranges from about 8 to about 18, and where x has an average value that ranges from about 1 to about 10.

* * * * *